United States Patent
Orsi et al.

(10) Patent No.: US 11,431,433 B2
(45) Date of Patent: Aug. 30, 2022

(54) OPTICAL PROTECTION SWITCHING FOR SINGLE FIBRE BIDIRECTIONAL WDM OPTICAL RING

(71) Applicant: Telefonaktiebolaget LM Ericsson (PUBL), Stockholm (SE)

(72) Inventors: Stefano Orsi, Genoa (IT); Paolo Debenedetti, Genoa (IT); Roberto Magri, Genoa (IT)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/290,074

(22) PCT Filed: Nov. 2, 2018

(86) PCT No.: PCT/EP2018/080065
§ 371 (c)(1),
(2) Date: Apr. 29, 2021

(87) PCT Pub. No.: WO2020/088784
PCT Pub. Date: May 7, 2020

(65) Prior Publication Data
US 2021/0399824 A1 Dec. 23, 2021

(51) Int. Cl.
*H04J 14/02* (2006.01)
(52) U.S. Cl.
CPC ...... *H04J 14/0283* (2013.01); *H04J 14/0204* (2013.01); *H04J 14/0267* (2013.01); *H04J 14/0297* (2013.01); *H04J 14/0287* (2013.01)
(58) Field of Classification Search
None
See application file for complete search history.

(56) References Cited

U.S. PATENT DOCUMENTS 5,367,395 A * 11/1994 Yajima ............... H04B 10/035
370/242
5,903,367 A * 5/1999 Moore ............... H04B 10/0773
398/4

(Continued)

FOREIGN PATENT DOCUMENTS

| WO | 2007 044939 A2 | 4/2007 |
| WO | 2015 003746 A1 | 1/2015 |
| WO | 2017 167400 A1 | 4/2016 |

OTHER PUBLICATIONS

PCT Notification of Transimttal of the International Search Report and the Written Opinion of the International Searching Authority, or the Declaration issued for International application No. PCT/EP2018/080065—dated Jul. 31, 2019.

*Primary Examiner* — Jai M Lee
(74) *Attorney, Agent, or Firm* — Baker Botts, LLP

(57) ABSTRACT

Optical protection switching apparatus (10), for a single fibre bidirectional WDM optical ring, comprising: first (12) and second (14) ports for coupling to first and second adjacent portions of a single fibre bidirectional WDM optical ring; an optical splitter (16) comprising an input to receive a WDM aggregate optical signal, and first and second outputs coupled to the first and second ports; an optical switch (108) between the second output and the second port; and processing circuitry (24) to receive at least one of an indication of transmission continuity in the optical ring and an indication of transmission discontinuity in the optical ring, and to generate a switch control signal (20) comprising instructions to cause the optical switch to be open when there is transmission continuity in the optical ring and to cause the optical switch to be closed when there is transmission discontinuity in the optical ring.

13 Claims, 8 Drawing Sheets

(56) References Cited

U.S. PATENT DOCUMENTS

| | | | | |
|---|---|---|---|---|
| 5,907,417 A * | 5/1999 | Darcie | H04J 14/0246 | 398/20 |
| 6,327,400 B1 * | 12/2001 | Harstead | H04B 10/275 | 385/16 |
| 6,456,406 B1 * | 9/2002 | Arecco | H04J 14/0206 | 398/59 |
| 6,925,219 B2 * | 8/2005 | Pfeiffer | H04Q 11/0062 | 398/4 |
| 7,099,578 B1 * | 8/2006 | Gerstel | H04J 14/0295 | 398/4 |
| 7,242,861 B2 * | 7/2007 | Sato | H04J 14/0227 | 398/19 |
| 7,272,321 B1 * | 9/2007 | Kuo | H04J 14/0241 | 398/100 |
| 7,302,176 B2 * | 11/2007 | Sakano | H04J 14/0283 | 398/4 |
| 7,499,647 B2 * | 3/2009 | Way | H04L 12/42 | 398/59 |
| 7,756,416 B2 * | 7/2010 | Tomofuji | H04J 14/0295 | 398/2 |
| 8,396,361 B2 * | 3/2013 | Grobe | H04J 14/0282 | 398/19 |
| 9,008,500 B2 * | 4/2015 | Zou | H04J 14/0289 | 370/254 |
| 9,723,385 B2 * | 8/2017 | Hu | H04Q 11/0005 | |
| 9,813,185 B2 * | 11/2017 | Cavaliere | H04Q 11/0062 | |
| 10,063,313 B1 * | 8/2018 | Al Sayeed | H04J 14/029 | |
| 10,826,601 B2 * | 11/2020 | Bhatnagar | H04B 10/25 | |
| 11,296,785 B2 * | 4/2022 | Magri | H04B 10/077 | |
| 2004/0037556 A1 * | 2/2004 | Matz | H04J 14/025 | 398/40 |
| 2007/0110434 A1 * | 5/2007 | Sato | H04J 14/0241 | 398/19 |
| 2009/0074403 A1 * | 3/2009 | Chi | H04B 10/275 | 398/3 |
| 2011/0116788 A1 * | 5/2011 | Ren | H04J 14/0201 | 398/3 |
| 2012/0195588 A1 * | 8/2012 | Way | H04J 14/0283 | 398/4 |
| 2013/0071104 A1 * | 3/2013 | Nakashima | H04J 14/0204 | 398/3 |
| 2014/0226966 A1 * | 8/2014 | Lutgen | H04B 10/032 | 398/5 |

* cited by examiner

OPTICAL PROTECTION SWITCHING FOR SINGLE FIBRE BIDIRECTIONAL WDM OPTICAL RING

PRIORITY

This nonprovisional application is a U.S. National Stage Filing under 35 U.S.C. § 371 of International Patent Application Serial No. PCT/EP2018/080065 filed Nov. 2, 2018 and entitled "OPTICAL PROTECTION SWITCHING FOR SINGLE FIBRE BIDIRECTIONAL WDM OPTICAL RING" which is hereby incorporated by reference in its entirety.

TECHNICAL FIELD

The invention relates to optical protection switching apparatus for a single fibre bidirectional wavelength division multiplexing, WDM, optical ring. The invention further relates to node for a bidirectional WDM optical ring network and to a bidirectional WDM optical ring network. The invention further relates to a method of optical protection switching in a single fibre bidirectional WDM optical ring.

BACKGROUND

Fronthaul networks are typically based on a single optical fibre infrastructure from a main node (Central Office) to remote nodes (radio antenna sites) using WDM technology for multiplexing multiple optical channels over the same optical fibre. In Single Fiber Working, SFW, the optical channels are transported using different wavelengths for uplink and downlink transmission on the same optical fiber. In the Fronthaul network segment, WDM pluggable modules are fitted in the radio access network, RAN, nodes (passive mode) or in transponders (active mode) and connected to passive optical filters.

Fronthaul network infrastructure typically reuses existing deployed fibre and can be based on point to point, P2P, topologies, point to multi-point, P2MP, topologies, such as star topologies with a remote feeder node, or a ring topology with a hub node communicating to all other nodes. P2P and P2MP topologies usually implement feeder protection by exploiting an optical 1:1 protection scheme comprising a switch at the main node and splitters at remote passive sites. A ring network topology allows a main node to be connected to many remote nodes by means of a single optical fiber, offering traffic protection and limiting latency. In many cases optical fiber is a valuable resource and network operators tend to minimize the number of fibres deployed in the fronthaul and backhaul network segments.

Prior art protection schemes for ring networks include electrical switching, per-channel switching and per-band switching. An electrical switching based protection scheme requires duplication of all the WDM transceivers in the ring with unacceptable cost increase and requires electrical switching at both the main node and the remote nodes. Per-channel switching requires two switches for each wavelength channel. Per-band switching, such as that described in WO2017/167400, reduces the number of switches to the number of bands in the system, for example four bands may be used.

SUMMARY

It is an object to provide an improved optical protection switching apparatus for a single fibre bidirectional wavelength division multiplexing, WDM, optical ring. It is a further object to provide an improved node for a bidirectional WDM optical ring network. It is a further object to provide an improved bidirectional WDM optical ring network. It is a further object to provide an improved method of optical protection switching in a single fibre bidirectional WDM optical ring.

An aspect of the invention provides optical protection switching apparatus for a single fibre bidirectional wavelength division multiplexing, WDM, optical ring. The apparatus comprises a first port, a second port, an optical splitter, an optical switch and processing circuitry. The first and second ports are for coupling to respective first and second adjacent portions of a single fibre bidirectional WDM optical ring. The optical splitter comprises an input configured to receive a WDM aggregate optical signal, a first output coupled to the first port and a second output coupled to the second port. The optical switch is coupled between the second output and the second port. The processing circuitry is configured to receive at least one of an indication of transmission continuity in the optical ring and an indication of transmission discontinuity in the optical ring. The processing circuitry is also configured to generate a switch control signal. The switch control signal comprising instructions to cause the optical switch to be open when there is transmission continuity in the optical ring or the switch control signal comprising instructions to cause the optical switch to be closed when there is transmission discontinuity in the optical ring.

The optical protection switching apparatus advantageously provides a simple protection scheme for a single fibre bidirectional WDM optical ring able to provide protection for a fibre break in any section of the optical ring, enabling nodes to be reached in both ring directions, so that each node can be reached according to its location relative to the fibre break.

The optical protection switching apparatus is advantageously configured to broadcast all optical channels of an WDM aggregate optical signal in both ring directions in case of a fibre break within the optical ring and to deliver the WDM aggregate optical signal into a single ring direction when no failure occurs.

During a failure the WDM aggregate optical signal is therefore still able to reach all of the nodes, and advantageously each node is reached via only one ring direction due to the fibre discontinuity, so no overlapping of the WDM aggregate optical signal occurs within the optical ring.

In an embodiment, the optical protection switching apparatus further comprises optical routing apparatus and optical detection apparatus. The optical routing apparatus is configured to deliver a probe optical signal to the first port. The optical detection apparatus is configured to detect a said probe optical signal received at the second port. The processing circuitry is configured to generate a switch control signal comprising instructions to cause the optical switch to be open when a said probe signal is detected at the optical detection apparatus and is configured to generate a switch control signal comprising instructions to cause the optical switch to be closed when a said probe signal is not detected at the optical detection apparatus.

The apparatus advantageously enables the status of an optical ring to be simply monitored using a pilot signal sent from the apparatus located at a main node across the ring up to the opposite side of the main node.

In an embodiment, the WDM aggregate optical signal comprises optical channel signals at channel wavelengths within a telecommunications wavelength band. The probe optical signal is at a wavelength outside the telecommunications wavelength band. The probe optical signal being out-of-band advantageously ensures that the probe optical signal does not to interfere with WDM channels in the optical ring and passes transparently through Add/Drop remote nodes of the optical ring, ensuring compatibility with existing installed passive filter technology.

In an embodiment, the WDM aggregate optical signal comprises optical channel signals at channel wavelengths within a telecommunications wavelength band. The probe optical signal is at a channel wavelength within the telecommunications wavelength band that is not used by the optical channel signals of the WDM aggregate optical signal.

An in-band probe optical signal at a wavelength not used by the optical channel signals advantageously ensures that the probe optical signal will pass through Add/Drop remote nodes of the optical ring and ensures compatibility with existing installed passive filter technology.

In an embodiment, the processing circuitry is configured to receive an alarm signal indicating a hardware failure preventing generation of a probe optical signal. The processing circuitry is also configured to generate a lockout control signal comprising instructions to cause the optical switch to be open when a said alarm signal is received.

The optical protection switching apparatus advantageously includes a mechanism to lock-out the protection switching in case of hardware failure of the probe signal circuitry. This advantageously avoids the optical switch being closed, i.e. operating in a broadcast status, which would affect the traffic due to overlapping of the WDM aggregate optical signal caused by the WDM aggregate optical signal being transmitted in both directions within the optical ring. The optical protection switching apparatus is advantageously put into a LOCKOUT status until the alarm signal clears, or the affected hardware is replaced.

In an embodiment, the optical protection switching apparatus further comprises a probe signal source configured to generate the probe optical signal.

In an embodiment, the processing circuitry is configured to receive an alarm signal indicating a hardware failure preventing the probe signal source generating a probe optical signal.

In an embodiment, the optical routing apparatus comprises an optical add filter provided between the first output of the optical splitter and the first port.

In an embodiment, the optical routing apparatus comprises a WDM multiplexer configured to deliver the WDM aggregate optical signal and the probe signal to the optical splitter input.

In an embodiment, the optical detection apparatus comprises an optical detector and second optical routing apparatus configured to deliver a said probe optical signal received at the second port to the optical detector.

In an embodiment, the second optical routing apparatus comprises an optical drop filter provided between the second port and the optical switch.

Corresponding embodiments and advantages apply equally to the node and the bidirectional WDM optical ring network described below.

A further aspect of the invention provides a node for a bidirectional WDM optical ring network. The node comprises optical protection switching apparatus for a single fibre bidirectional WDM optical ring. The optical protection switching apparatus comprises a first port, a second port, an optical splitter, an optical switch, optical routing apparatus, optical detection apparatus and processing circuitry. The first and second ports are for coupling to respective first and second adjacent portions of a single fibre bidirectional WDM optical ring. The optical splitter comprises an input configured to receive a WDM aggregate optical signal, a first output coupled to the first port and a second output coupled to the second port. The optical switch is coupled between the second output and the second port. The optical routing apparatus is configured to deliver a probe optical signal to the first port. The optical detection apparatus is configured to detect a said probe optical signal received at the second port. The processing circuitry is configured to generate a switch control signal. The switch control signal comprising instructions to cause the optical switch to be open when a said probe signal is detected at the optical detector or the switch control signal comprising instructions to cause the optical switch to be closed when a said probe signal is not detected at the optical detector.

In an embodiment, the bidirectional WDM optical ring network comprises first and second single fibre bidirectional WDM optical rings. The node comprises first and second said optical protection switching apparatus. The first said optical protection switching apparatus has respective first and second ports for coupling to respective first and second adjacent portions of the first single fibre bidirectional WDM optical ring. The second said optical protection switching apparatus has respective first and second ports for coupling to respective first and second adjacent portions of the second single fibre bidirectional WDM optical ring.

The node is advantageously able to provide optical protection switching for a dual fibre optical ring.

A further aspect of the invention provides a bidirectional WDM optical ring network comprising a main node, a plurality of passive WDM add/drop nodes and a single fibre bidirectional WDM optical ring connecting the main node and the passive add/drop nodes. The main node comprises optical protection switching apparatus for a single fibre bidirectional WDM optical ring. The optical protection switching apparatus comprises a first port, a second port, an optical splitter, an optical switch, optical routing apparatus, optical detection apparatus and processing circuitry. The first and second ports are for coupling to respective first and second adjacent portions of a single fibre bidirectional WDM optical ring. The optical splitter comprises an input configured to receive a WDM aggregate optical signal, a first output coupled to the first port and a second output coupled to the second port. The optical switch is coupled between the second output and the second port. The optical routing apparatus is configured to deliver a probe optical signal to the first port. The optical detection apparatus is configured to detect a said probe optical signal received at the second port. The processing circuitry is configured to generate a switch control signal. The switch control signal comprising instructions to cause the optical switch to be open when a said probe signal is detected at the optical detector or the switch control signal comprising instructions to cause the optical switch to be closed when a said probe signal is not detected at the optical detector.

In an embodiment, the bidirectional WDM optical ring network further comprises a second single fibre bidirectional WDM optical ring, connecting the main node and the passive WDM add/drop nodes. The main node further comprises a second said optical protection switching apparatus, for the second single fibre bidirectional WDM optical ring.

In an embodiment, the bidirectional WDM optical ring network further comprises a controller comprising interface circuitry and processing circuitry. The processing circuitry is configured to perform compensation for a differential delay between uplink and downlink transmission when a respective probe signal is not detected at the respective optical detection apparatus of one optical ring and a respective probe signal is detected at the respective optical detection apparatus of the other optical ring.

In case a fibre break occurs in only one fibre of a dual fibre optical ring, the network is advantageously able to put the optical protection switching apparatus for the broken ring into a protection state, by closing the switch to broadcast in both directions, and keep the optical protection switching apparatus for the unbroken ring a normal state, transmitting in a single ring direction. In this condition some nodes may transmit on one ring side and receive from the other side introducing a differential delay between uplink and downlink. The differential delay compensation performed by the controller processing circuitry advantageously ensures symmetrical latency, required for mobile RAN networks.

A further aspect of the invention provides a method of protection switching in a single fibre bidirectional WDM optical ring. The method comprises a step of receiving a WDM aggregate optical signal and power splitting the WDM aggregate optical signal to form first and second replica WDM aggregate optical signals. The method further comprises a step of delivering a probe optical signal into the optical ring. The method further comprises a step of determining whether the probe optical signal has been received back, indicating transmission of the probe optical signal around the complete optical ring. The method further comprises a step of coupling the first replica WDM aggregate optical signal into the optical ring for transmission in a first ring direction if the probe optical signal has been received back. The method further comprises a step of coupling the first replica WDM aggregate optical signal into the optical ring for transmission in a first ring direction and coupling the second replica WDM aggregate optical signal into the optical ring for transmission in a second ring direction, opposite to the first ring direction, if the probe optical signal has not been received back.

The method advantageously provides a simple protection scheme for a single fibre bidirectional WDM optical ring able to provide protection for a fibre break in any section of the optical ring, enabling nodes to be reached in both ring direction, so that each node can be reached according to its location relative to the fibre break.

The method advantageously broadcasts all optical channels of an WDM aggregate optical signal in both ring directions in case of a fibre break within the optical ring and couples the WDM aggregate optical signal into a single ring direction when no failure occurs. The method advantageously enables the status of an optical ring to be simply monitored using a pilot signal transmitted around the ring.

During a failure the WDM aggregate optical signal is therefore still able to each all of the nodes, and advantageously each node is reached via only one ring direction due to the fibre discontinuity, so no overlapping of the WDM aggregate optical signal occurs within the optical ring.

In an embodiment, the WDM aggregate optical signal comprises optical channel signals at wavelengths within a telecommunications wavelength band and the probe optical signal is at a wavelength outside the telecommunications wavelength band. The probe optical signal being out-of-band advantageously ensures that the probe optical signal does not to interfere with WDM channels in the optical ring and passes transparently through Add/Drop remote nodes of the optical ring, enabling the method to be use with existing installed passive filter technology.

In an embodiment, the WDM aggregate optical signal comprises optical channel signals at channel wavelengths within a telecommunications wavelength band. The probe optical signal is at a channel wavelength within the telecommunications wavelength band that is not used by the optical channel signals of the WDM aggregate optical signal.

An in-band probe optical signal at a wavelength not used by the optical channel signals advantageously ensures that the probe optical signal will pass through Add/Drop remote nodes of the optical ring and enables the method to be used with existing installed passive filter technology.

In an embodiment, the step of delivering the probe optical signal into the optical ring comprises adding the probe optical signal to the first replica WDM aggregate optical signal for transmission in the first ring direction. The method may advantageously be applied to continuously monitor ring continuity.

In an embodiment, the step of delivering the probe optical signal into the optical ring comprises adding the probe optical signal to the WDM aggregate optical signal before power splitting the WDM aggregate optical signal. The method may advantageously be applied to continuously monitor ring continuity.

In an embodiment, the method further comprises a step of receiving an alarm signal indicating a hardware failure preventing generation of the probe optical signal and a step of coupling only the first replica WDM aggregate optical signal into the optical ring for transmission in the first ring direction while the alarm signal is received.

The method advantageously enables lock-out of the protection switching in case of hardware failure relating to the probe signal. This advantageously avoids operation in broadcast mode due to a probe signal hardware failure, which would affect the traffic due to overlapping of the WDM aggregate optical signal caused by the WDM aggregate optical signal being transmitted in both directions within the optical ring.

Embodiments of the invention will now be described, by way of example only, with reference to the accompanying drawings.

DETAILED DESCRIPTION

The same reference numbers will used for corresponding features in different embodiments.

Figure 1:
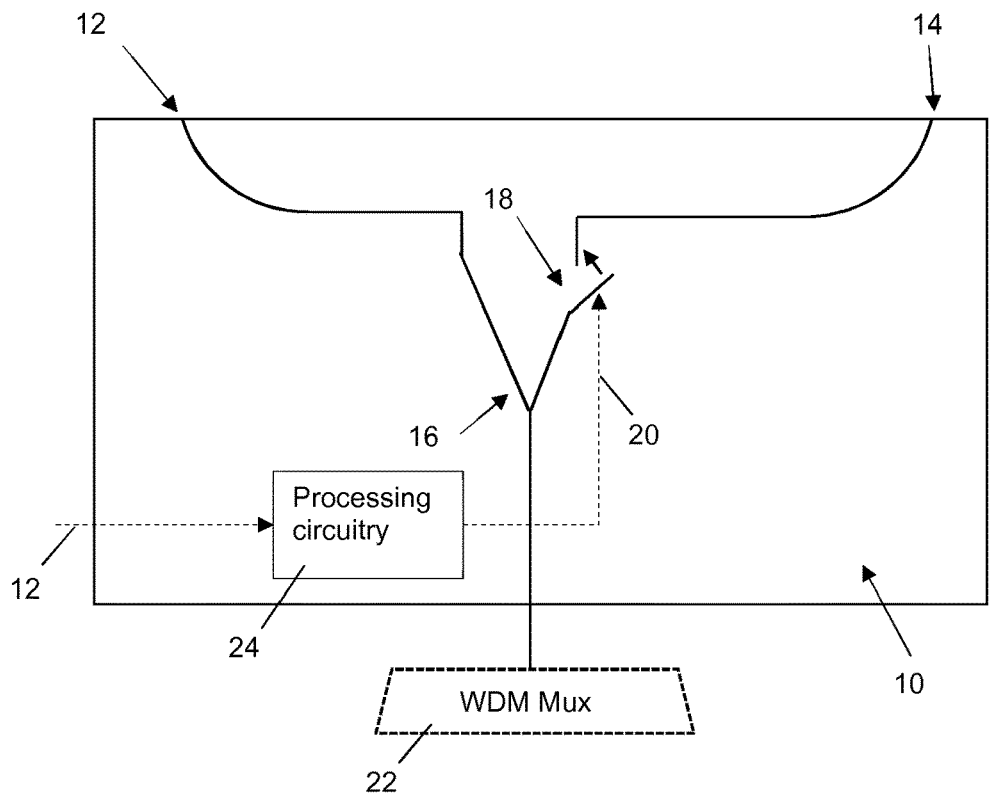
FIGS. 1 to 6 illustrate optical protection switching apparatus, according to embodiments of the invention, for a single fibre bidirectional wavelength division multiplexing, WDM, optical ring.

Referring to FIG. 1, an embodiment of the invention provides optical protection switching apparatus 10 for a single fibre bidirectional wavelength division multiplexing, WDM, optical ring. The optical protection switching apparatus comprises a first port 12, a second port 14, an optical splitter 106, an optical switch 108 and processing circuitry 24. The first and second ports are for coupling to respective first and second adjacent portions of a single fibre bidirectional WDM optical ring. The optical splitter comprises an input, a first output and a second output. The input is configured to receive a WDM aggregate optical signal from, for example, a WDM multiplexer 22 (shown in outline for completeness but not forming part of this embodiment). The first output of the optical splitter is coupled to the first port and the second output is coupled to the second port. The optical splitter is configured to power split a received WDM aggregate optical signal, to output first and second replica WDM aggregate optical signals at the first and second outputs.

For example, the optical splitter may be a 1:2 passive optical splitter having an input arm and first and second output arms, respectively coupled to the first and second ports.

The optical switch 18 may be a 1:2 optical switch, coupled between the second output of the optical splitter and the second port. The optical switch has an open state (as illustrated) in which transmission of optical signals through the optical switch is blocked and a closed state in which transmission of optical signals through the optical switch is allowed.

The processing circuitry 24 is configured to receive at least one of an indication of transmission continuity in the optical ring and an indication of transmission discontinuity in the optical ring. An indication of transmission continuity may comprise, for example, a probe detection signal output by optical ring continuity monitoring apparatus, such as an optical time domain reflectometer, OTDR, indicating transmission of a probe signal around the optical ring. An indication of transmission discontinuity may comprise, for example, a probe alarm signal output by optical ring continuity monitoring apparatus, indicating that a probe signal delivered into the optical ring has not been detected, or may comprise a lack of a probe detection signal. Similarly, an indication of transmission continuity may comprise a lack of a probe alarm signal.

The processing circuitry 24 is configured to generate a switch control signal 20 comprising instructions to cause the optical switch to be open when there is transmission continuity in the optical ring. The processing circuitry 24 is configured to generate a switch control signal comprising instructions to cause the optical switch to be closed when there is transmission discontinuity in the optical ring. As discussed earlier transmission continuity and discontinuity may be signalled in two different way, either by presence or absence of the probe alarm signal. In both approaches the operations are the same, but the inputs triggering these operations are opposite.

Figure 2:
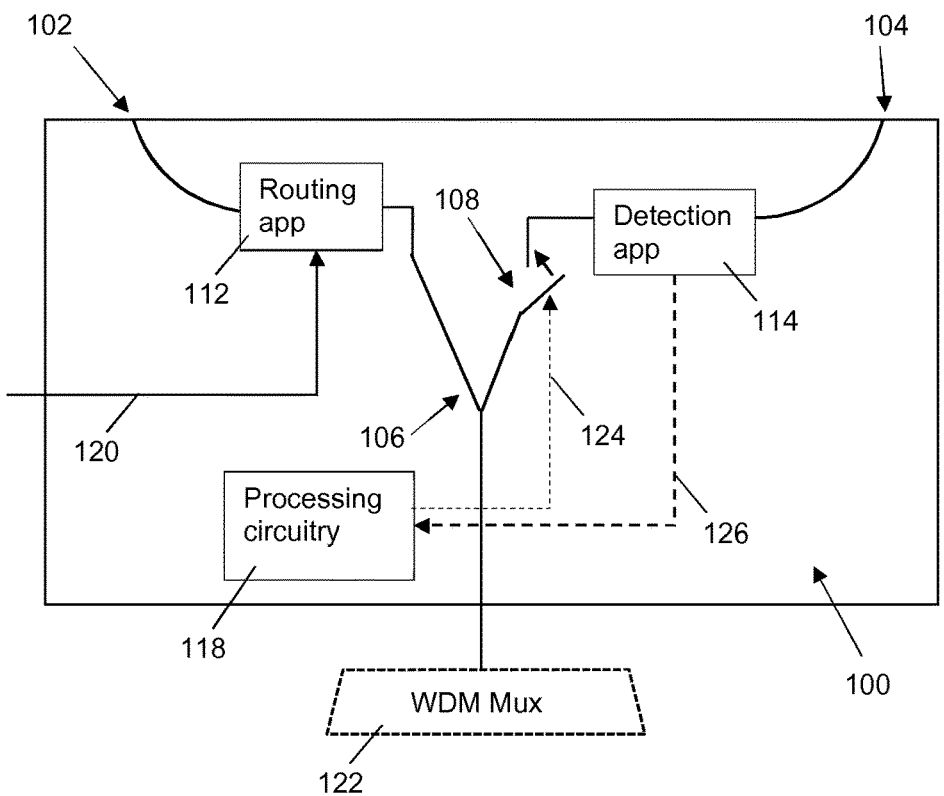

Referring to FIG. 2, an embodiment of the invention provides optical protection switching apparatus 100 for a single fibre bidirectional wavelength division multiplexing, WDM, optical ring. The optical protection switching apparatus comprises a first port 102, a second port 104, an optical splitter 106, an optical switch 108, optical routing apparatus 112, optical detection apparatus 114 and processing circuitry 118.

The optical routing apparatus is configured to deliver a probe optical signal to the first port. The optical routing apparatus 112, provided in this embodiment between the first output of the optical splitter and the first port, is configured to deliver a probe optical signal 120 to the first port. The probe optical signal may, for example, be: an unmodulated optical signal; an optical signal modulated with a pilot tone, such as a sinusoidal modulation at a frequency of the order of kHz; or a digital optical signal, such as a pseudorandom bit sequence, PRBS, for example a GbE supervisory channel.

The optical detection apparatus 114 is configured to detect a probe optical signal received back at the second port, following transmission from the first port round the optical ring. The processing circuitry is configured to generate a switch control signal comprising instructions to cause the optical switch to be open when a said probe signal is detected at the optical detection apparatus and is configured to generate a switch control signal comprising instructions to cause the optical switch to be closed when a said probe signal is not detected at the optical detection apparatus. When a probe signal, delivered into the optical ring at the first port, is received back at the second port, indicating optical fibre continuity in the optical ring, the optical switch is caused to be open, so that the WDM aggregate optical signal is delivered into the optical ring via the first port, for transmission in a single ring direction. When a probe signal, delivered into the optical ring at the first port, is not received back at the second port, indicating an optical fibre break in the optical ring, the optical switch is caused to be closed, so that the WDM aggregate optical signal is delivered into the optical ring via both the first port and the second port, for transmission in both ring directions, ensuring that the WDM aggregate optical signal still reaches each node within the optical ring.

In one embodiment, the optical detection apparatus 114 is configured to generate a probe detection signal 126 indicating presence of a probe optical signal. The processing circuitry 118 is configured to generate the switch control signal in response to the presence or absence of a probe detection signal.

In an alternative embodiment, the optical detection apparatus is configured to generate a probe alarm signal 126 indicating absence of a probe optical signal. The processing circuitry 118 is configured to generate the switch control signal in response to the presence or absence of a probe alarm signal.

In an embodiment the WDM aggregate optical signal comprises optical channel signals at channel wavelengths within a telecommunications wavelength band and the probe optical signal is at a wavelength outside the telecommunications wavelength band. In an embodiment, the WDM aggregate optical signal comprises channel wavelengths within the C band and probe signal is at a wavelength in the O band, for example 1310 nm.

In an embodiment, the WDM aggregate optical signal comprises optical channel signals at channel wavelengths within a telecommunications wavelength band. The probe optical signal is at a channel wavelength within the telecommunications wavelength band that is not used by the optical channel signals of the WDM aggregate optical signal, so it will not be dropped or added at any of the nodes within the optical ring. For example, the WDM aggregate optical signal comprises channel wavelengths $\lambda 1$ to $\lambda 23$ in the C band and the probe wavelength is $\lambda 24$.

In an embodiment, the optical splitter is a 1:2 passive optical splitter configured with a splitting ratio to give the optical splitter symmetric losses for each output.

Figure 3:
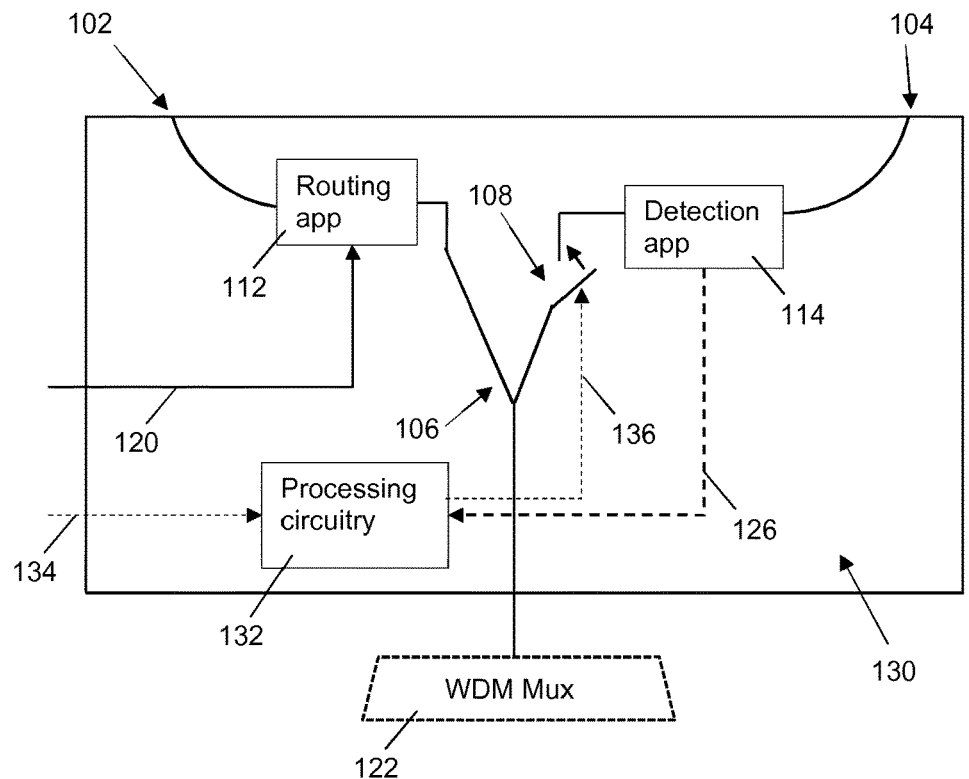

In an embodiment, illustrated in FIG. 3, the processing circuitry 132 of the optical protection switching apparatus 130 is additionally configured to receive an alarm signal 134 indicating a hardware failure preventing generation of a probe optical signal. The alarm signal may, for example, be a system alarm. The processing circuitry 132 is configured to generate a lockout control signal 136 comprising instructions to cause the optical switch to be open when a said alarm signal is received.

In an embodiment, the optical routing apparatus 112 comprises an optical add filter.

Figure 4:
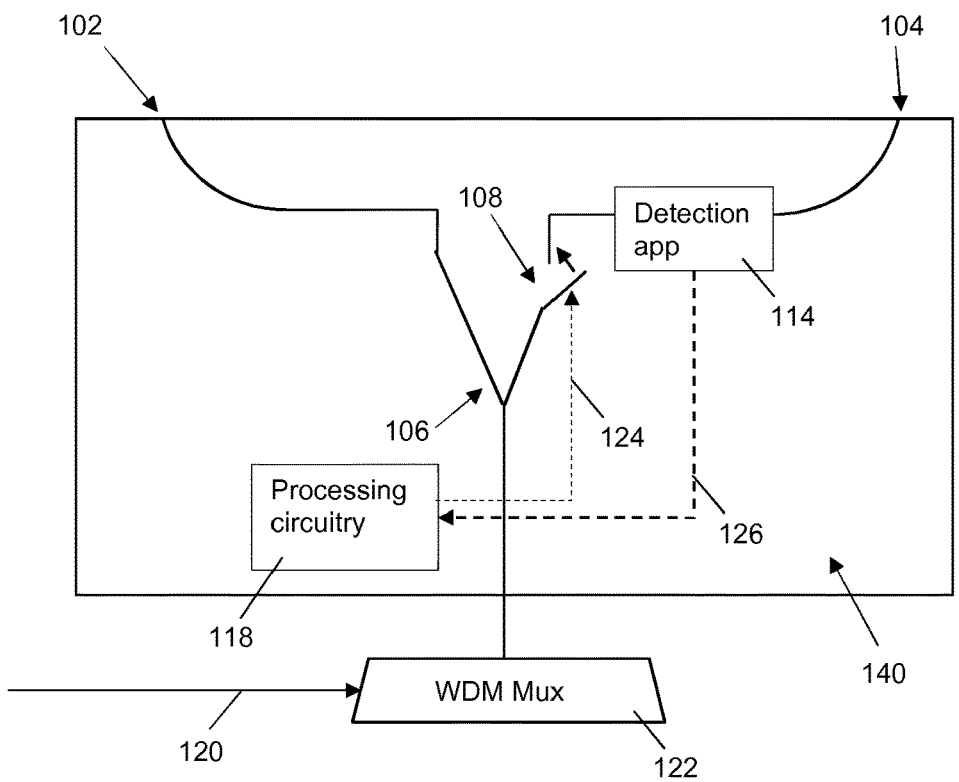

In an embodiment, illustrated in FIG. 4, the optical routing apparatus comprises the WDM multiplexer 122 configured to deliver the WDM aggregate optical signal and the probe signal to the optical splitter input.

Figure 5:
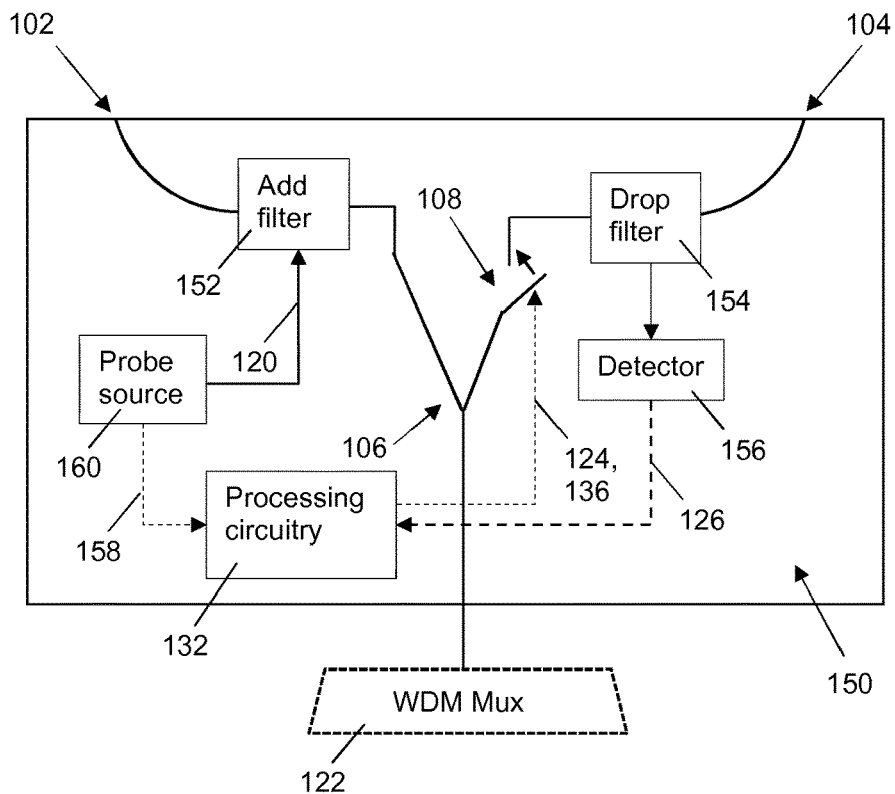

In an embodiment, illustrated in FIG. 5, the optical protection switching apparatus 150 further comprises a probe signal source 160 configured to generate the probe optical signal 120. The probe signal source may, for example, comprise a laser or a low rate small form factor pluggable, SFP, transceiver.

The optical routing apparatus comprises an optical add filter 152 provided between the first output of the optical splitter 106 and the first port 102.

The processing circuitry 132 is configured to receive an alarm signal 158 indicating a hardware failure of the probe signal source, preventing generation of a probe optical signal. The processing circuitry 132 is configured to generate a lockout control signal 136 comprising instructions to cause the optical switch 106 to be open when a said alarm signal is received. The alarm signal may, for example, indicate laser failure or bias current failure. The optical switch will remain open until the alarm signal is cleared or the faulty hardware is replaced.

The optical detection apparatus comprises an optical drop filter 154 and an optical detector 156. The optical drop filter is provided between the second port 104 and the optical switch 108, and the optical drop filter is configured to deliver a said probe optical signal received at the second port to the optical detector. The optical detector may, for example, be a low speed photodiode.

Figure 6:
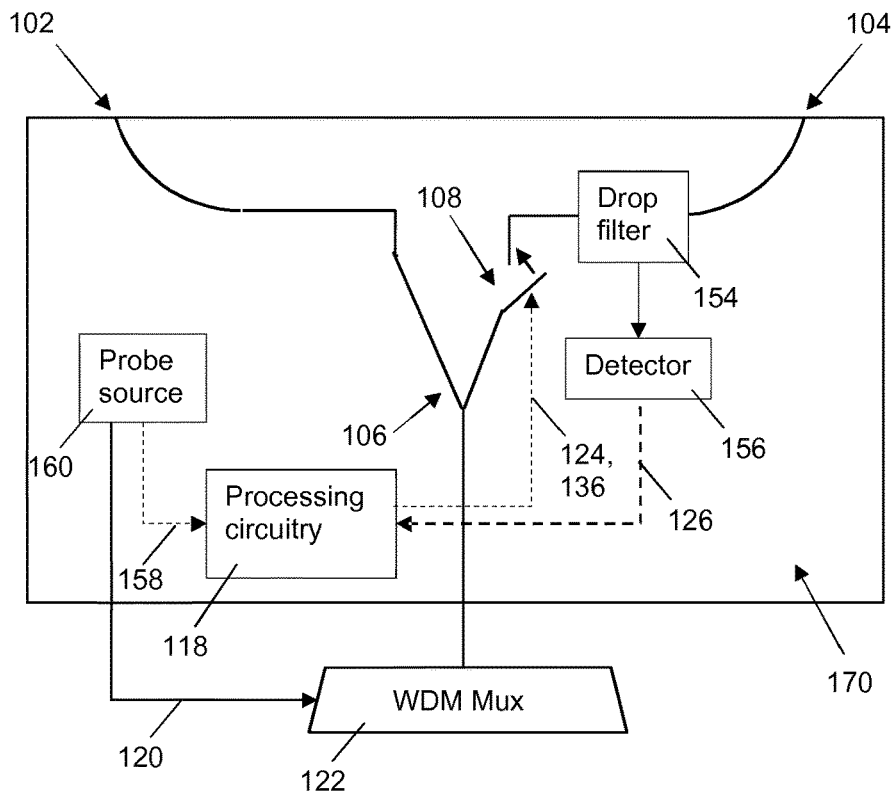

In an embodiment, illustrated in FIG. 6, the optical routing apparatus comprises the WDM multiplexer 122 configured to deliver the WDM aggregate optical signal and the probe signal to the optical splitter input.

Figure 7:
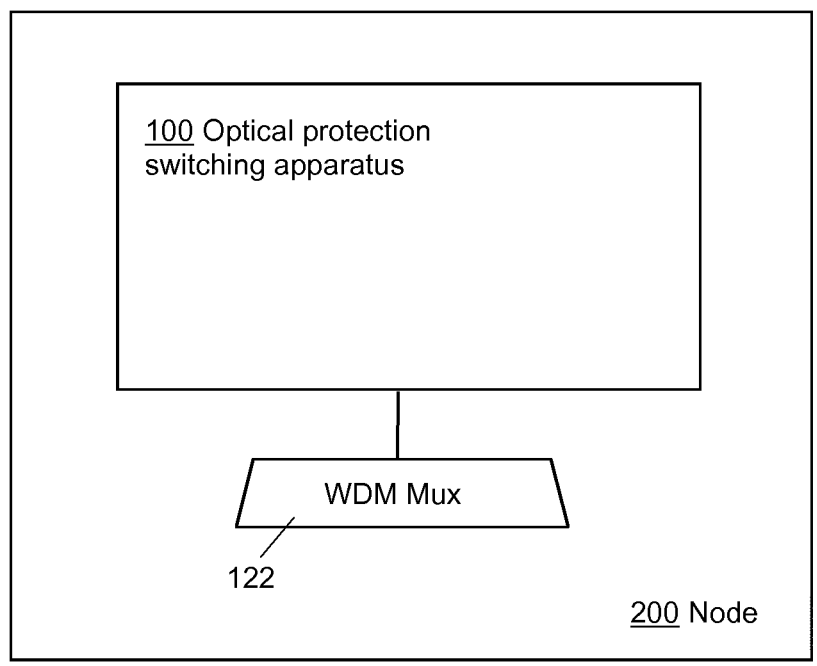
FIGS. 7 and 8 illustrate nodes, according to embodiments of the invention, for a bidirectional WDM optical ring network.

Referring to FIG. 7, an embodiment of the invention provides a node 200 for a bidirectional WDM optical ring network. The node comprises optical protection switching apparatus 100 for a single fibre bidirectional WDM optical ring. It will be appreciated that any of the optical protection switching apparatus 10, 130, 140, 150, 170 described above with reference to any of FIGS. 1 to 6 may be used.

Figure 8:
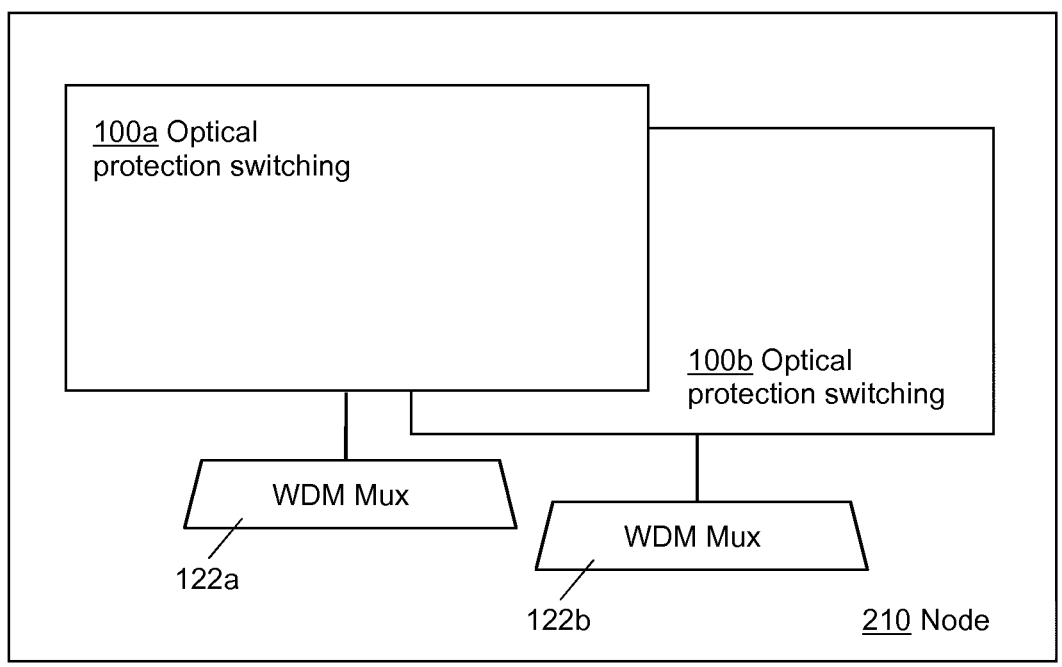

In an embodiment, illustrated in FIG. 8, the node 210 is for a bidirectional WDM optical ring network comprising first and second single fibre bidirectional WDM optical rings. The node 210 comprises first and second optical protection switching apparatus 100.

The first optical protection switching apparatus 100a has respective first and second ports for coupling to respective first and second adjacent portions of the first single fibre bidirectional WDM optical ring. The second said optical protection switching apparatus 100b has respective first and second ports for coupling to respective first and second adjacent portions of the second single fibre bidirectional WDM optical ring. In case of link failure of both optical rings, the node 210 operates exactly as in the single optical ring case, by simultaneous change into broadcast mode on both optical rings. In access networks this case is considered the most likely case since fibre are usually laid down in the same cable and failure is likely to occur to both fibres simultaneously.

In the case that a fibre break occurs only in one optical ring, which is expected to be a rare case, one optical protection switching apparatus goes into a protection state, closing the optical switch 108, and the other direction stays in normal state, with the optical switch remaining open. In this condition some nodes on the optical rings may transmit on one ring side and receive from the other side introducing a differential delay between uplink and downlink. To overcome this problem, for example in for mobile RAN networks where latency must be symmetrical, digital latency compensation techniques, such as that described in unpublished PCT/EP2018/053829, can applied.

Figure 9:
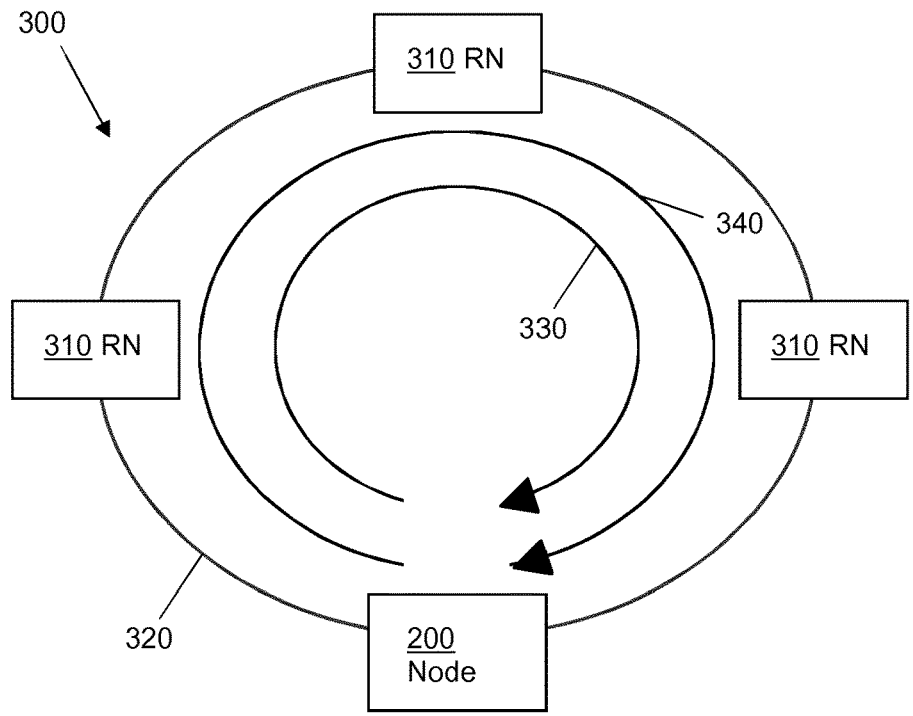
FIGS. 9 to 11 illustrate bidirectional WDM optical ring networks according to embodiments of the invention.
Figure 10:
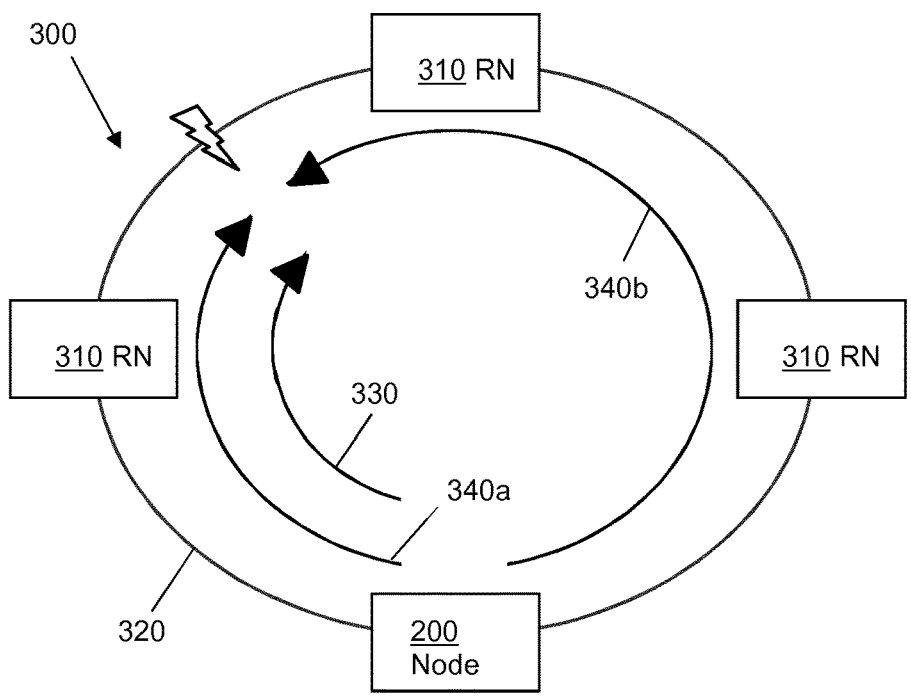
Figure 11:
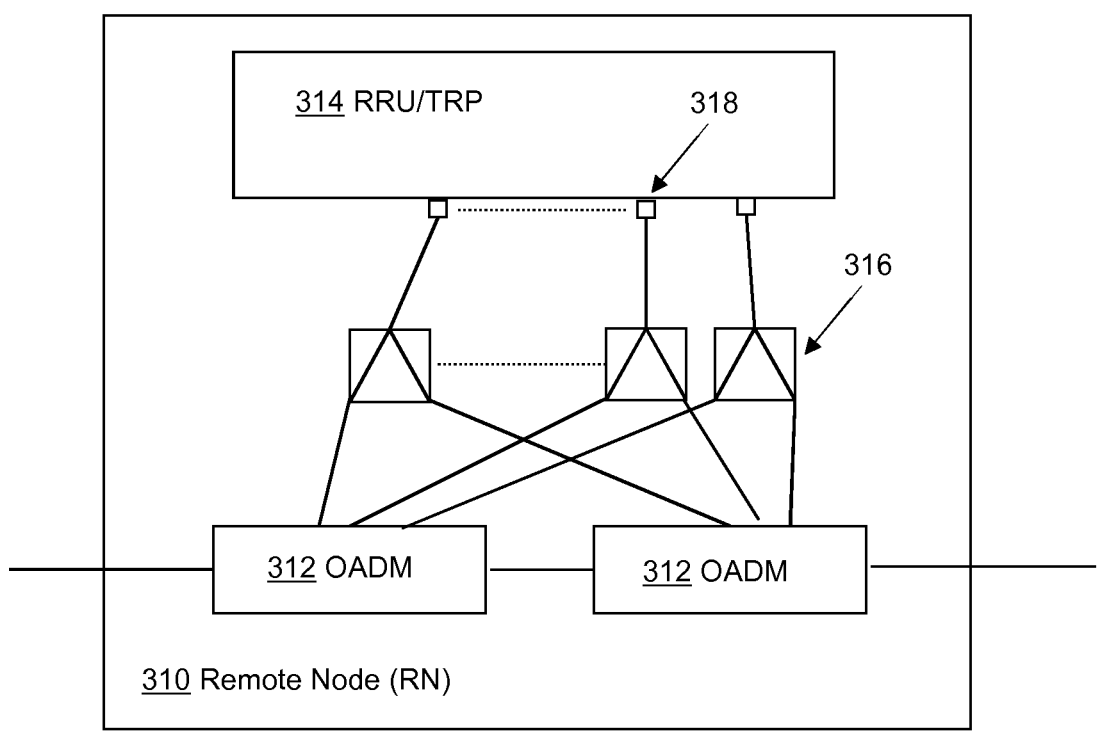

Referring to FIGS. 9 to 11, an embodiment of the invention provides a bidirectional WDM optical ring network 300 comprising a main node 200, a plurality of passive WDM add/drop remote nodes, RN, 310 and a single fibre bidirectional WDM optical ring 320 connecting the main node and the passive add/drop nodes.

The main node 200 comprises optical protection switching apparatus 10, 100, 130, 140, 150, 170 for a single fibre bidirectional WDM optical ring, as described above with reference to any of FIGS. 1 to 6.

The remote nodes 310 are standard passive remote nodes, as illustrated in FIG. 10, comprising optical add/drop multiplexers, OADM, 312, optical splitters 316 and a remote radio unit, RRU, or transponder, TRP, 314 comprising a plurality of optical modules 318. The remote nodes are configured to add and drop WDM channels with standard OADMs coupled with splitters that broadcast toward the main node 200 in both ring directions.

In operation, a probe optical signal 330 is delivered into the optical ring 320 from the optical protection switching apparatus in the main node 200. In normal operation, illustrated in FIG. 9, the probe optical signal is transmitted around the complete optical ring 320 in one ring direction, West in this example. Detection of the probe optical signal back at the main node indicates fibre continuity in the optical ring, the optical switch 108 of the optical protection switching apparatus is set open and the WDM aggregate optical signal is delivered into the optical ring also in the West direction. So, when the optical ring is operating properly the probe optical signal is detected and the processing circuit keeps the optical switch open transmitting the WDM aggregate optical signal clockwise and blocking transmission of the WDM aggregate optical signal in the opposite direction, to avoid interference at the remote nodes.

As discussed above, the probe optical signal can either be an out-of-band signal, at a wavelength outside the wavelength band occupied by the WDM aggregate optical signal, or can be an in-band signal at a channel wavelength not used by the WDM aggregate optical signal. In the case of an in-band probe optical signal, the remote nodes 310 are configured so that the probe optical signal passes through the nodes, without being dropped. The remote nodes 310 are also configured not to transmit uplink optical signals at the channel wavelength assigned to the probe optical signal.

As illustrated in FIG. 10, if a fibre break occurs in a hop of the optical ring 320, the probe optical signal is not received back at the main node 200, indicating a fibre break to the optical protection switching apparatus. The optical switch 108 is closed in response and the WDM aggregate optical signal 340a, 340b is delivered into the optical ring for transmission in both directions, West and East, so that all of the RNs 310 continue to receive the WDM aggregate optical signal.

The network 300 avoids the need to use per-channel or per-band protection switching exploiting instead a broadcast transmission of the WDM aggregate optical signal in both ring directions when there is a fibre break. This is possible because when the fiber in the ring is broken each remote node is reached from one direction only and no overlap between the replica WDM aggregate optical signals occurs; each remote nodes receives one and only one WDM service payload from either West or East direction. In this way the remote nodes can be based on the known passive scheme based on OADM filters with splitters to receive and transmit from both direction at the same time.

The optical protection switching apparatus enables protection of communications traffic running on a single fiber optical ring using a simple mechanism that only needs to be implemented at the main node 200. The optical protection switching apparatus comprises a few low-cost components, can be self-confined in the main node and is compatible with existing passive remote OADM nodes for access/fronthaul architectures. The optical protection switching apparatus also enables broadband switching and any add/drop traffic matrix in the ring nodes can be supported. It is compatible with single and dual fiber optical rings and it is traffic agnostic.

In an embodiment, the bidirectional WDM optical ring network comprises a second single fibre bidirectional WDM optical ring, connecting the main node and the passive WDM add/drop remote nodes. The main node further comprises a second optical protection switching apparatus, for the second single fibre bidirectional WDM optical ring.

In an embodiment, first and second optical rings may be configured for single fibre working, SFW, in which the first optical ring is a working path and the second optical ring is a protection path. Uplink and downlink optical signals are carried over the working path during normal operation and over the protection path if a break occurs in the first optical ring. A differential delay can arise upon switching from the working path to the protecting path. The bidirectional WDM optical ring network may further comprise a controller comprising interface circuitry and processing circuitry. The processing circuitry is configured to perform compensation for such as differential delay between uplink and downlink optical signals.

In an embodiment, first and second optical rings may be configured for dual fibre working, DFW, in which the first optical ring carries uplink optical signals and the second optical ring carries downlink optical signals. A differential delay between uplink and downlink optical signals can arise as some nodes on the optical rings may transmit on one ring side and receive from the other side. The bidirectional WDM optical ring network further comprises a controller comprising interface circuitry and processing circuitry. The processing circuitry is configured to perform compensation for a differential delay between uplink and downlink transmission in one of the single fibre bidirectional WDM optical rings when a probe signal is not received back at the main node for one optical ring but a probe signal is received back for the other optical ring.

Figure 12:
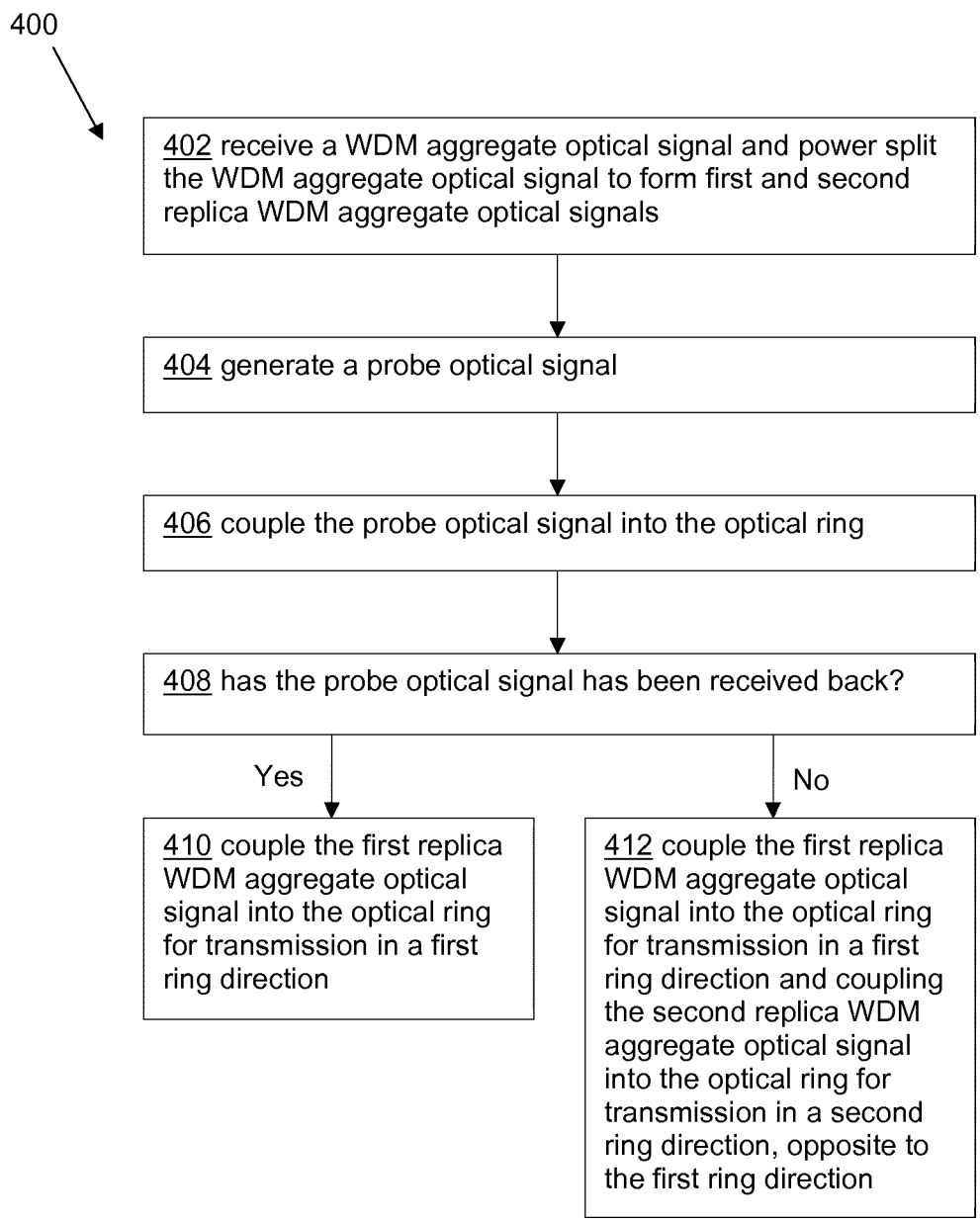
FIGS. 12 and 13 illustrates steps of methods according to embodiments of the invention of protection switching in a single fibre bidirectional WDM optical ring.

Referring to FIG. 12, an embodiment of the invention provides a method 400 of protection switching in a single fibre bidirectional WDM optical ring. The method comprises receiving 402 a WDM aggregate optical signal and power splitting the WDM aggregate optical signal to form first and second replica WDM aggregate optical signals. A probe optical signal is delivered 406 into the optical ring and the method comprises determining 408 whether the probe optical signal has been received back, indicating transmission of the probe optical signal around the complete optical ring. The probe optical signal may, for example, be: an unmodulated optical signal; an optical signal modulated with a pilot tone, such as a sinusoidal modulation at a frequency of the order of kHz; or a digital optical signal, such as a pseudo-random bit sequence, PRBS, for example a GbE supervisory channel.

If the probe optical signal has been received back, indicating optical fibre continuity in the optical ring, the first replica WDM aggregate optical signal is coupled 410 into the optical ring for transmission in a first ring direction, for example West. If the probe optical signal has not been received back, indicating a discontinuity in the optical ring, such as a fibre break, the first replica WDM aggregate optical signal is coupled 412 into the optical ring for transmission in a first ring direction, for example West, and the second replica WDM aggregate optical signal is coupled 412 into the optical ring for transmission in a second ring direction, opposite to the first ring direction, for example East.

In one embodiment, determining whether the probe optical signal has been received back comprises receiving a probe detection signal indicating presence of a probe optical signal.

In an alternative embodiment, determining whether the probe optical signal has been received back comprises receiving a probe alarm signal indicating absence of a probe optical signal.

In an embodiment the WDM aggregate optical signal comprises optical channel signals at channel wavelengths within a telecommunications wavelength band and the probe optical signal is at a wavelength outside the telecommunications wavelength band. In an embodiment, the WDM aggregate optical signal comprises wavelengths within the C band and probe signal has a wavelength in the O band, for example 1310 nm.

In an embodiment, the WDM aggregate optical signal comprises optical channel signals at channel wavelengths within a telecommunications wavelength band. The probe optical signal is at a channel wavelength within the telecommunications wavelength band that is not used by the optical channel signals of the WDM aggregate optical signal, so it will not be dropped or added at any of the nodes within the optical ring. For example, the WDM aggregate optical signal comprises channel wavelengths $\lambda 1$ to $\lambda 23$ in the C band and the probe wavelength is $\lambda 24$.

In an embodiment, the step of delivering the probe optical signal into the optical ring comprises adding the probe optical signal to the first replica WDM aggregate optical signal for transmission in the first ring direction.

In an embodiment, the step of delivering the probe optical signal into the optical ring comprises adding the probe optical signal to the WDM aggregate optical signal before power splitting the WDM aggregate optical signal.

In an embodiment, the method further comprises a step of receiving an alarm signal indicating a hardware failure preventing generation of the probe optical signal and a step of coupling only the first replica WDM aggregate optical signal into the optical ring for transmission in the first ring direction while the alarm signal is received.

Figure 13:
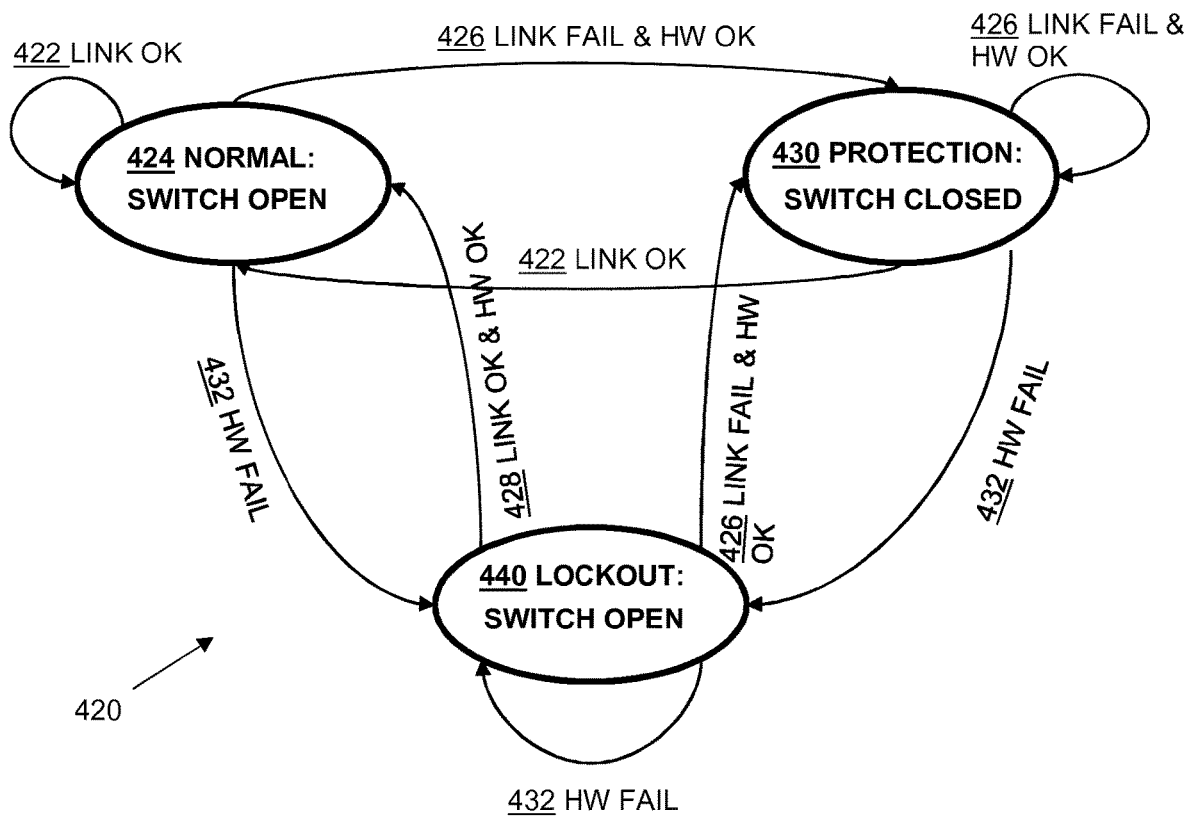

FIG. 13 illustrates a state machine of a method 420 according to an embodiment of the invention of protection switching in a single fibre bidirectional WDM optical ring, using the optical protection switching apparatus 150 described above with reference to FIG. 4.

If the probe optical signal 120 is received back from the optical ring, indicating optical fibre continuity in the optical ring, the state machine is set to "LINK OK" 422, and the apparatus 150 operates in a NORMAL state 424, with optical switch 108 open. If the probe optical signal 120 is not received back from the optical ring, indicating an optical fibre break in the optical ring, and a probe alarm signal 158 is not received, indicating that the probe source is operating correctly, the apparatus 150 is put into a PROTECTION state 430, with the optical switch closed. Once the fibre break has been repaired and the status returns to LINK OK, the apparatus 150 is returned to the NORMAL state 424.

If a probe alarm signal 158 is received, indicating a hardware, HW, failure preventing the probe optical signal being generated, the apparatus 150 is put into a LOCKOUT state 440, with the switch 108 open. Once the probe optical signal has been cleared, indicating hardware OK, and assuming the probe optical signal is also received, LINK OK and HW OK 428, the apparatus 150 is returned to the NORMAL state 424.

The invention claimed is:

1. Optical protection switching apparatus for a single fibre bidirectional wavelength division multiplexing, WDM, optical ring, the apparatus comprising:
   first and second ports for coupling to respective first and second adjacent portions of a single fibre bidirectional WDM optical ring;
   an optical splitter comprising an input configured to receive a WDM aggregate optical signal, a first output coupled to the first port and a second output coupled to the second port;
   an optical switch coupled between the second output and the second port; and
   processing circuitry configured to receive at least one of an indication of transmission continuity in the optical ring and an indication of transmission discontinuity in the optical ring, and configured to generate a switch control signal comprising instructions to cause the optical switch to be open when there is transmission continuity in the optical ring or comprising instructions to cause the optical switch to be closed when there is transmission discontinuity in the optical ring;
   wherein the processing circuitry is configured to receive an alarm signal indicating a hardware failure preventing generation of a probe optical signal and is configured to generate a lockout control signal comprising instructions to cause the optical switch to be open when the alarm signal indicating the hardware failure is received.

2. Optical protection switching apparatus according to claim 1, further comprising:
   optical routing apparatus configured to deliver a probe optical signal to the first port; and
   optical detection apparatus configured to detect a said probe optical signal received at the second port, and wherein the processing circuitry is configured to generate a switch control signal comprising instructions to cause the optical switch to be open when a said probe signal is detected at the optical detection apparatus and comprising instructions to cause the optical switch to be closed when a said probe signal is not detected at the optical detection apparatus.

3. Optical protection switching apparatus according to claim 2, wherein the optical detection apparatus comprises an optical drop filter provided between the second port and the optical switch.

4. Optical protection switching apparatus according to claim 1, wherein the WDM aggregate optical signal comprises optical channel signals at channel wavelengths within a telecommunications wavelength band and the probe optical signal is at one of a wavelength outside the telecommunications wavelength band or a channel wavelength within the telecommunications wavelength band that is not used by the optical channel signals of the WDM aggregate optical signal.

5. Optical protection switching apparatus according to claim 1, further comprising a probe signal source configured to generate the probe optical signal.

6. Optical protection switching apparatus according to claim 1, wherein the optical routing apparatus comprises an optical add filter provided between the first output of the optical splitter and the first port.

7. Optical protection switching apparatus according to claim 1, wherein the optical routing apparatus comprises a WDM multiplexer configured to deliver the WDM aggregate optical signal and the probe signal to the optical splitter input.

8. A node for a bidirectional WDM optical ring network, the node comprising optical protection switching apparatus for a single fibre bidirectional WDM optical ring according to claim 1.

9. A bidirectional WDM optical ring network comprising:
   a main node comprising optical protection switching apparatus for a single fibre bidirectional WDM optical ring according to claim 1;
   a plurality of passive WDM add/drop nodes; and
   a single fibre bidirectional WDM optical ring connecting the main node and the passive add/drop nodes.

10. A method of protection switching in a single fibre bidirectional WDM optical ring, the method comprising steps of:
    receiving a WDM aggregate optical signal and power splitting the WDM aggregate optical signal to form first and second replica WDM aggregate optical signals;
    delivering a probe optical signal into the optical ring;
    determining whether the probe optical signal has been received back, indicating transmission of the probe optical signal around the complete optical ring;
    coupling the first replica WDM aggregate optical signal into the optical ring for transmission in a first ring direction if the probe optical signal has been received back;
    coupling the first replica WDM aggregate optical signal into the optical ring for transmission in a first ring direction and coupling the second replica WDM aggregate optical signal into the optical ring for transmission in a second ring direction, opposite to the first ring direction, if the probe optical signal has not been received back;
    receiving an alarm signal indicating a hardware failure preventing generation of the probe optical signal; and
    coupling only the first replica WDM aggregate optical signal into the optical ring for transmission in the first ring direction while the alarm signal is received.

11. A method according to claim 10, wherein the WDM aggregate optical signal comprises optical channel signals at wavelengths within a telecommunications wavelength band and the probe optical signal has a probe wavelength outside the telecommunications wavelength band.

12. A method according to claim 10, wherein delivering the probe optical signal into the optical ring comprises adding the probe optical signal to the first replica WDM aggregate optical signal for transmission in the first ring direction.

13. A method according to claim 10, wherein delivering the probe optical signal into the optical ring comprises adding the probe optical signal to the WDM aggregate optical signal before power splitting the WDM aggregate optical signal.

* * * * *